(12) United States Patent
Edlinger (10) Patent No.: US 8,568,507 B2
(45) Date of Patent: Oct. 29, 2013

(54) METHOD FOR PROCESSING SOLID OR MOLTEN MATERIALS

(75) Inventor: Alfred Edlinger, Dälmaweg (AT)

(73) Assignee: SGL Carbon SE, Wiesbaden (DE)

( * ) Notice: Subject to any disclaimer, the term of this patent is extended or adjusted under 35 U.S.C. 154(b) by 247 days.

(21) Appl. No.: 12/737,820

(22) PCT Filed: Aug. 25, 2009

(86) PCT No.: PCT/AT2009/000329
§ 371 (c)(1),
(2), (4) Date: Apr. 11, 2011

(87) PCT Pub. No.: WO2010/022425
PCT Pub. Date: Mar. 4, 2010

(65) Prior Publication Data
US 2011/0179907 A1 Jul. 28, 2011

(30) Foreign Application Priority Data
Aug. 27, 2008 (AT) .................................... 1329/2008

(51) Int. Cl.
*C22B 7/00* (2006.01)
*C22B 9/22* (2006.01)
*C22B 4/00* (2006.01)

(52) U.S. Cl.
USPC ......... 75/10.14; 75/10.39; 75/10.4; 75/10.46; 75/10.44; 75/10.59; 75/375; 75/380

(58) Field of Classification Search
USPC ............ 75/10.14, 10.59, 10.39, 10.43, 10.44, 75/380, 375
See application file for complete search history.

(56) References Cited

U.S. PATENT DOCUMENTS

| 3,948,640 | A | * | 4/1976 | Elvander et al. | ............. 75/10.17 |
| 6,478,839 | B1 | | 11/2002 | Kansa et al. | |
| 8,361,187 | B2 | * | 1/2013 | Edlinger | ..................... 75/10.14 |
| 2009/0266200 | A1 | | 10/2009 | Edlinger | |

FOREIGN PATENT DOCUMENTS

| DE | 626 822 | 3/1936 |
| JP | 5-074558 A | 3/1993 |
| JP | 5-237468 A | 9/1993 |
| JP | 9-272909 A | 10/1997 |

(Continued)

OTHER PUBLICATIONS

Jones, F. "Resistivity." Resistivity. UBC Earth and Ocean Sciences, Jun. 28, 2007. Downloaded Feb. 5, 2013 from http://www.eos.ubc.ca/ubcgif/iag/foundations/properties/resistivity.htm.*

(Continued)

*Primary Examiner* — George Wyszomierski
*Assistant Examiner* — Tima M McGuthry Banks
(74) *Attorney, Agent, or Firm* — Chapman and Cutler LLP (57) ABSTRACT

In a method for processing and/or reducing solid or molten materials and/or pyrophoric materials, in particular shredder light fractions, the solid or molten materials are charged onto an at least partially inductively heated graphite body, wherein a reducing agent different from the carbon of the graphite is introduced, and the flowing-off reduced and/or degassed melt is collected, wherein the reducing agent is introduced together with the solid or molten charging materials, and, as the reducing agent, natural gas, hydrocarbons, hydrogen, carbon monoxide and/or ammonia are introduced along with water vapor, oxygen, carbon dioxide and/or halogens or hydrogen halides.

18 Claims, 5 Drawing Sheets

(56) References Cited

FOREIGN PATENT DOCUMENTS

| | | | |
|---|---|---|---|
| JP | 2000-320979 | A | 11/2000 |
| JP | 2001-310177 | A | 11/2001 |
| JP | 2002-48322 | A | 2/2002 |
| JP | 2003-039048 | A | 2/2003 |
| JP | 2007-204782 | A | 8/2007 |
| JP | 2008-528256 | A | 7/2008 |
| WO | WO 2006/079132 | A1 | 8/2006 |

OTHER PUBLICATIONS

Machine translation of JP 2001-310177 published Nov. 6, 2001.*
Machine translation of JP 2007-204782 published Aug. 16, 2007.*

\* cited by examiner

METHOD FOR PROCESSING SOLID OR MOLTEN MATERIALS

The invention relates to a method for processing and/or reducing solid or molten materials and/or pyrophoric materials, in particular shredder light fractions, shredded used tires, oily mill scale, PCB (polychlorinated biphenyls), contaminated used wood, contaminated excavated material (dioxins or furans), petroleum distillation residues and dried sewage sludge.

Dusts and slags, in particular refuse slags, shredder light fractions, composite materials like coated aluminum foils, steel slags as well as slags from non-iron metallurgy and inorganic technology, contain a number of metal oxides, wherein considerable amounts of heavy-metal oxides are contained in the slag in the case of steel slags. To reduce such undesired metal oxides and, in particular, the oxides of chromium, vanadium, molybdenum, tungsten, cobalt, manganese, lead, copper and zinc, it has already been proposed to pour liquid melt onto a suitable reducing metal bath, in particular iron bath, containing dissolved carbon, whereby the reduced metals will pass into the metal regulus. For the economic implementation of such a method, it is, however, necessary in most cases to use the starting materials directly as a melt in order to be able to utilize the sensible heat of the melt. In all redox reactions of this type, the slag is, furthermore, in equilibrium with the metal bath and, owing to the conditions of equilibrium, heavy-metal oxides could never be completely reduced to such an extent that the oxides remaining in the slag would be below the analytical detection limit. This applies, in particular, to chromium and vanadium oxides, which would remain in the reduced slags in quantities mostly exceeding 1000 ppm.

Glasses and, in particular, glass melts can only be produced in a colorless manner, if even extremely slight traces of heavy-metal oxides are quantitatively removed from such glass melts, since metal oxides would impart respective colors to the glass. When processing glass or glass melts, fining will, as a rule, be additionally required in order to reliably remove even the finest glass bubbles as they are also formed in reduction processes for eliminating metal oxides. This will only be feasible at accordingly high temperatures and with accordingly low-viscous melts as well as relatively low bath levels still enabling the escape of gases.

In this context, it has already been proposed in WO 2006/079132 A1 to feed solid particles and/or melts onto an at least partially inductively heated bed or column containing lumpy coke, and to collect the reduced and/or degassed melt running off. Such a coke bed has a substantially higher reduction potential than the known metal baths, wherein both melting and reducing operations are directly performed in the coke bed or on the coke particles. That method, however, involved the drawback of the coke bed having relatively high sulfur contents and only coupling at very high induction frequencies, thus calling for relatively high expenditures in terms of electrical equipment. The respective frequencies were about 50 to 100 kHz, which in turn resulted in that the required energy could only be introduced on the outer edge of the coke bed because of the skin effect. In order to sufficiently heat the coke bed also in the center of the bulk, a high input was required, since thermal conduction through the coke from the inductively heated edge zone to the center of the same occurred only to a very small extent. The known method, moreover, involved the drawback that the coke was gradually consumed in the course of the reduction reactions and therefore had to be continuously refilled, which called for relatively expensive measures in apparatus terms. A main problem was that, when feeding cold coke onto the red-hot bulk, the coke was decomposed into extremely fine dust such that a sufficiently high porosity of the bulk was no longer ensured and high pressure losses had to be accepted.

The invention aims to improve a method of the initially defined kind to the effect that, while avoiding the above-mentioned drawbacks, not only solid materials but also melts can be quantitatively freed from heavy-metal oxides to the major extent in a particularly simple and economic manner and that, in particular, a number of heavy-metal oxides can be eliminated to below detection limits, wherein it is, at the same time, to be ensured that the melts charged or formed in the course of the process will be completely degassed or refined. In particular, it is to be possible to readily process problematic materials like shredder light fractions.

To solve this object, the method according to the invention essentially consists in that the solid or molten materials are charged on an at least partially inductively heated graphite body, reducing agents different from the carbon of the graphite are introduced, and the flowing-off reduced and/or degassed melt is collected, wherein the reducing agents are introduced together with the solid or molten charging materials, and, as said reducing agents, natural gas, brown-coal dust, hydrocarbons, hydrogen, carbon monoxide and/or ammonia are introduced along with water vapor, oxygen, carbon dioxide and/or halogens or hydrogen halides.

Since the reducing agents are no longer formed by the inductively heated bulk itself, but are introduced and, in particular, introduced together with the solid or molten charging materials, or as solid or molten charging materials or pyrophoric materials, the inductively heated graphite body is not used up, or only consumed to a negligible extent, such that expensive devices for refilling graphite can be completely obviated. Since the graphite bulk is basically not used up, it has become possible to adjust both axial and radial gradients of the graphite parameters within the bulk. It is thus, for instance, possible for optimizing the temperature and flow conditions, to locally influence the size, shape, crystalline content and electrical conductance of the individual graphite bodies in order to achieve the respective effects. In addition to the already mentioned reactants, oxidized and thermally pretreated steel mill dusts can also be employed. Lead, halogens and alkalis are expelled during the thermal pretreatment outside the reactor so as to enable very pure zinc, optionally in oxide form, to be recovered from the exhaust gas of the method according to the invention.

The reducing agent can be introduced as a component of the solid or molten charging materials or separately from the charging materials.

The shredder light fraction is charged onto the graphite and gasified at about 1500-2000° C. Due to the high temperatures and the reducing atmosphere, dioxins, furans and PCBs can be cleaved immediately. Tar can likewise be gasified. The pyrolysis coke produced is gasified by the addition of water vapor and/or oxygen. Possibly contained sulfur is dissolved as calcium sulfide in the accordingly adjusted slag. Metal and slag components are liquefied and can be tapped separately. The contaminated gas produced is sucked off to gas treatment and purified there. Because of the injected water vapor and the oxygen as gasification agent, the purified gas will not be diluted by air and, therefore, be free of nitrogen oxides (NOx). The gas is preferably used as a reducing gas in blast furnaces or for direct reduction processes, as an alternative fuel gas in cement clinker kilns, for various metallurgical (preheating) furnaces, for the direct conversion into electricity (e.g. in gas engines) or for a Fischer-Tropsch synthesis due to its high $H_2$ content.

Since the solid particles and/or the melts are charged onto an inductively heated graphite body and reducing agents are introduced, it has become possible to provide the thermal energy required for the reduction independently of the occurring reduction reaction. The graphite body may in this case be preferably formed by a bed, a column or a bulk of lumpy graphite. Alternatively, the graphite body may be configured as a graphite block comprising through-going channels, bores or the like. What all these configurations have in common is the clearances remaining between the graphite lumps of the bed, column or bulk, or in the channels or bores of the graphite block, in which clearances the reduction reaction primarily takes place in the gaseous phase. The reduction in these clearances of the graphite body can occur immediately, wherein also a melt agglomeration will occur there due to the high turbulence and surface forces. The reaction mechanisms may comprise both the indirect reduction of metal oxide with carbon monoxide to metal and carbon dioxide, or with hydrogen to metal and water, and the direct reduction of metal oxide with carbon to metal and carbon monoxide. Carbon dioxide is in turn converted into carbon monoxide with reactive carbon, and forming water will react with carbon to hydrogen and carbon monoxide via a water gas reaction.

Since the method according to the invention makes it possible to separately provide the necessary thermal energy and the reducing agent, a plurality of different reducing agents can be employed, wherein the actually employed reducing agent can be selected as a function of the reducing requirements and economic aspects.

Graphite, which is a very good electrical conductor, already couples at substantially lower induction frequencies and, in particular, at frequencies of above 0.5 kHz such that the above-mentioned drawbacks in terms of electrical installations can be avoided. The electrical conductivity of graphite decreases with the temperature increasing. But the fact that the coupling of graphite is already induced at lower induction frequencies helps avoid a pronounced skin effect so as to enable the input energy to penetrate more deeply into the cross section of the graphite body and hence provide more uniform inductive heating. The induction frequency in this case is, however, largely freely selectable such that is also conceivable to choose higher frequencies in order to deliberately achieve a stronger skin effect. This will be helpful if the edge zone is heated to such an extent that, due to the high viscosity of the gases in the superheated edge zone, the majority of the reaction gases will be focused towards the center of the reactor, with the refractory material of the reactor being protected by the viscosity-related, minimized mass transfer occurring in the edge zone. At the same time, the thermal conductivity of graphite is higher by a multiple than that of coke such that a temperature equalization by heat conduction will occur over the entire cross section of the graphite body in addition to more uniform inductive heating.

According to a preferred embodiment of the present invention, the method can be further developed to the effect that the solid or molten materials and the reducing agents different from the carbon of the graphite as well as, optionally, the solid or molten charging materials are sucked into the graphite bed. This can be accomplished in that a pressure gradient is adjusted over the axial length of the graphite bulk, which pressure gradient allows the particles and gases to flow from the charging end of the bulk to the tap end. In this manner, the safe application of the method according to the invention will be ensured.

If, as in correspondence with a preferred embodiment of the present invention, coal dust or brown-coal dust is introduced as said reducing agent, a reduction potential that is higher by a multiple than that of a coke bed (cf. WO 2006/079132 A1) will be achieved. When impinging on, or penetrating into the clearances of, the inductively heated graphite body, the coal dust together with the likewise introduced oxygen/water vapor is immediately converted into carbon monoxide and hydrogen so as to ensure a highly efficient reduction of the reactants. A further advantage resides in that coal dust is substantially cheaper than coke. Brown-coal dust, which is available in an extremely cost-effective manner, is particularly suitable for the implementation of the method according to the invention. On the one side, because brown-coal dust, which, as opposed to pure coal dust, is relatively strongly loaded with accompanying substances, results in a plurality of volatilized substances having high reduction potentials during pyrolysis and, on the other side, because the relatively high sulfur content contained in the brown-coal dust completely passes into the slag fraction, thus totally eliminating the problems and costs of the exhaust gas desulfurization involved in this kind of use of brown coal.

In a preferred manner, the method is further developed to the effect that solid reducing agents are introduced by the aid of a carrier gas and, in particular, nitrogen, $CO_2$, $O_2$ or air. This will, on the one hand, ensure the homogenous distribution on the surface of the bulk, of the materials to be reduced or melted and, on the other hand, prevent the formation of major amounts of product gas, thus avoiding excessive entrainment of particles from the bulk and limiting the pressure loss of the bulk.

According to a preferred mode of operation, gases may be injected into the inductively heated graphite body provided by the invention, particularly into the bed or into the bulk comprising lumpy graphite, so as to enable the redox potential of the graphite body to be controlled within wide limits. The redox potential may, for instance, be neutralized in order to enable a process control by which only nobler metals will be reduced from their metal oxides, whereas less noble metals will remain in the melt. At the same time, such a gas supply, in addition to the adjustment of the redox potential, also enables a change of temperature in order to recondense volatilizing substances in respective regions of the graphite body. The temperature of the graphite body can be controlled in a particularly simple manner during inductive heating by changing the electrical power input so as to enable complete process control that can take into account a great number of different parameters in a simple and relatively small-structured reactor. At appropriately high temperatures, it will be readily feasible to reduce even chromium and vanadium oxides.

The charging materials can preferably be charged directly onto the red-hot graphite body, whereby, in the course of the method according to the invention, a rapid degasification or fining of glass melts will, for instance, be achieved at accordingly elevated temperatures due to the relatively thin layer. Overall, temperatures of 2000° C. and more can be readily achieved through an inductively heated graphite body and, in particular, an inductively heated bed or column comprising lumpy graphite. The use of a lumpy material primarily serves to ensure the desired permeability for gases and liquid melts.

According to a preferred embodiment of the present invention, the method is further developed to the effect that graphite is used in the form of spheres, cylinders, blocks, pelletized compacts and/or electrode debris. By appropriately selecting the geometric shape in which the graphite is present in the bulk, the bulk density and hence the pressure loss to be expected through the bulk can be adapted to the respective requirements. In a particularly cost-effective manner, at a geometrically very suitable shape, graphite can be employed in the form of used electrodes and used graphite cathodes from Al electrolysis (=SPL→spent potliner) applied in electric steel production. SPLs contain up to 15% alkalis and up to 1% CN (cyanide), are used graphite electrodes from primary Al production and constitute a huge disposal problem throughout the world. When using SPLs, the cyanide is destroyed at T>900° C. (HCN→H$_2$+C+N$_2$) and the alkalis pass into the forming product slag. When using water vapor, the NaCN from an SPL is dissolved into the Na$_2$O of the slag according to the formula below:

The sizes of the graphite bodies in this case range between about 5 mm to about 5 cm in terms of diameter.

Advantageously, the graphite bodies may, however, also be comprised of a mixture of graphite and catalyst powder, which was pressed and optionally sintered, in order to impart special catalytic properties to the bulk and adapt it to the chemical and physical process requirements deemed to be suitable in the respective case. In this context, it is also conceivable, according to a preferred embodiment of the present invention, to press the graphite bodies with suitable salts and/or metals or ceramics in order to adjust their electrical conductivity.

To adjust the flow properties of the graphite bulk or column to the optimum level, the method according to the invention is advantageously further developed to the effect that the graphite bodies are configured in a controlled manner as regards their micro-porosities. In a preferred manner, the method according to the invention is performed such that said inductive heating is effected by applying current at two different frequencies, by selecting a low and a high frequency. The high frequency preferably ranges between 3 and 15 kHz and serves to inductively heat the graphite. The low frequency is preferably below 0.5 kHz and causes a Lorenz force to act on the graphite bodies so as to make them move. As a result, the hot, reduced charging stock is agitated by the graphite bodies due to the electrodynamic impulse acting on the same. This agitating effect significantly accelerates reactions by the mass transfer/heat exchange.

In order to prevent current bridges from forming at adjacent graphite pieces and the loss of heat caused thereby, the method is preferably carried out in a manner that the graphite body is introduced as a bulk of a mixture of graphite and inert packing bodies, in particular catalytically active CaO or MgO bodies. The inert packing bodies largely prevent direct contacts between individual graphite pieces, thus causing each graphite piece to form a separate heating cell.

In a preferred manner, the method according to the invention is performed such that Zn-containing steel mill dusts are charged together with the charging materials in order to bind sulfur (ZnO+H$_2$S→ZnS+H$_2$O).

The device for processing or reducing solid or molten materials and/or pyrophoric materials, in particular shredder light fractions, is equipped with a feed opening for the solid or molten material and a tap opening for the treated melt. Such a device is essentially characterized by a tubular or chute-like housing containing a graphite body, and a heating device surrounding the housing and comprising at least one induction coil for inductively heating the graphite body. For adjusting the redox potential and/or providing local cooling, the configuration is preferably devised such that pipes for feeding gases are connected to the housing. In a particularly simple manner, the configuration may be devised such that the tubular housing is formed by an electrically insulating material such as Al$_2$O$_3$ or MgO, or by at least one electrically insulating foil or mat, and encompassed by a cooled induction coil.

Such an electrically insulating foil can, for instance, be comprised of high-temperature resistant chromium-corundum mats whose mechanical support in the beginning is achieved by the usually water-cooled induction coil. When feeding molten material, or during the formation of a melt, the electrically insulating foil is rapidly covered by a slag or melt coat, since the induction coil is appropriately cooled, so as to substantially enhance the mechanical stability of the column and, at the same time, completely eliminate problems with the refractory material. It is, however, also conceivable to cast the induction bodies into the refractory mass so as to enable the induction bodies to assume also mechanical properties. The refractory mass may in this case be comprised of magnetite, spinel or corundum as well as refractory concrete.

In order to be able to sectionally change the temperature of the graphite body and, in particular, of the bed or column of lumpy graphite in a simple manner, the configuration is advantageously devised such that the induction coil is divided into several sections in the axial direction of the tubular housing, wherein separate temperature measuring means and/or separate power input measuring means are preferably provided for axially consecutive sections of the tubular housing, and the temperature and the redox regime are controllable in separate sections by adjusting the electrical power and/or the gases to be injected and/or the gas volumes.

The device is configured in a manner that a killing or tranquillization zone is arranged to axially follow the reduction zone, which is located in the region of the heating device. In said zone, the reaction products occurring in the reaction zone are blended, and melt droplets are agglomerated, so as to obtain a homogenous product. In a preferred manner, the killing zone is dimensioned such that the axial length of the killing zone corresponds to one to two times the clear width of the tubular housing so as to achieve thorough blending of the gases and, at the same time, enable still solid particles present in the gaseous phase to be melted. To lower the flow rate, the diameter of the reactor is preferably adapted in this region.

In the following, the invention will be explained in more detail by way of exemplary embodiments of the device, which are schematically illustrated in the drawing. Therein.

Figure 1:
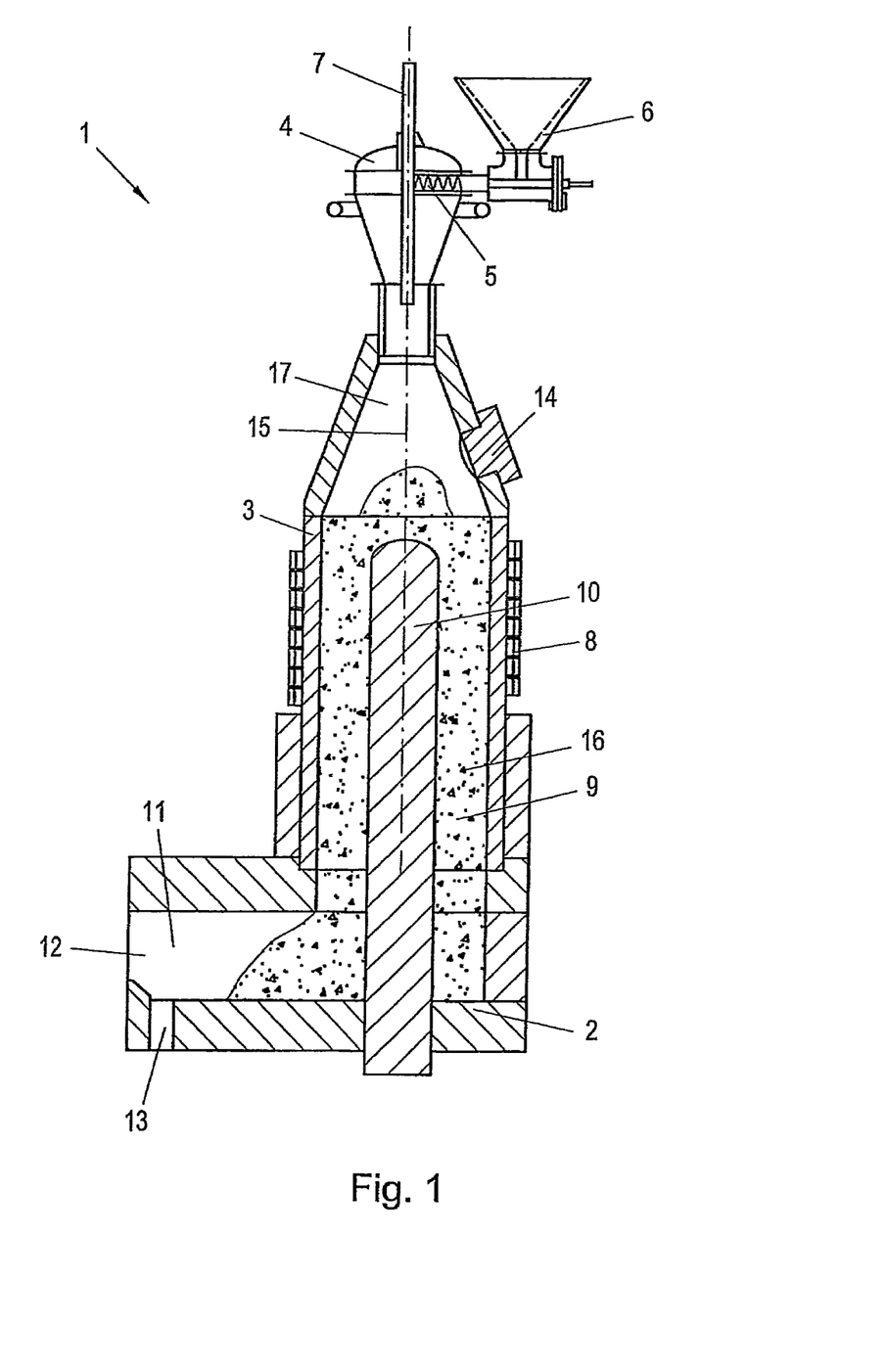
FIG. 1 illustrates a configuration of a reactor for accommodating a graphite column for performing the method according to the present invention.

FIG. 1 depicts a reactor 1 containing a graphite bed or graphite column 16 and comprising a base 2 and a housing 3. The housing 3, in its upper portion, which is located adjacent the charging end for solid particles or melts, tapers conically while forming a diffuser for the introduced batches, and carries a feeding device for dusts, slags, melts and/or slurries or for metal oxide glasses, which feeding device in the present case is substantially comprised of a dosing cyclone 4, to which the materials to be reduced or degassed are supplied by a worm conveyor 5, said materials to be reduced being kept in stock in a charging hopper 6, optionally mixed with the reducing agent and, if desired, with additives like SiO$_2$. The dosing cyclone in this case is operated with an inert gas like nitrogen, wherein a lance 7, which is adjustable in the axial direction, may be additionally provided for introducing carbon dust. Such a dosing cyclone is, for instance, described in WO 03/070651. The housing 3, in an axial region, is surrounded by an induction coil 8 via which the graphite bulk or bed 16 can be inductively heated. A killing zone 9 is arranged to follow the housing portion comprising the induction coils 8, wherein no thermal energy is introduced into the killing zone, which consequently functions as a killing and blending zone following the reaction. By 10 is denoted a displacement body which, in the simplest case, serves to keep free the graphite core region, which is possibly hard to heat, and may serve to optimize the flow control. At the same time, it is conceivable to feed additional gases via the displacement body, or to provide the displacement body with further induction bodies.

In the chamber 11, the reaction gases are separated from the metal melt, wherein the gases may be drawn off through an opening 12, while the melt runs off through a tap opening 13. By 14 is denoted an opening through which the graphite bulk 16 can be renewed by adding, for instance, graphite spheres or electrode debris. Gas feeding and temperature control allow the adjustment of both a redox gradient and a temperature gradient over the axial length, i.e. in the longitudinal direction of the axis 15 of the reactor, so as to ensure successful iron-oxide-free and heavy-metal-oxide-free slag and metal taps in the tap region 13 and avoid refractory problems also on this location.

The wall of the housing 3 of the reactor 1 may be comprised of simple refractory foils, which are moistened by melt during melting or running-down of the melt so as to form suitable slag or melt coats. The coil 8 is designed as a water-cooled copper conductor, ensuring the appropriate cooling of the wall, and hence the formation of a slag or melt coat layer.

Between the feeding device 4 and the graphite body 16 may be arranged a precombustion or preheating zone 17, into which at least one conduit (not illustrated) for introducing an energy carrier and/or an oxidative gas for precombustion or preheating may open.

Afterburning at the feeding end/tapping end, and in the graphite column, to burn CO to $CO_2$ is basically possible and will lead to an efficiency increase by a fossil heat input. In this case, the graphite bulk surface, which is very inert anyhow, is partially covered by the slag melt so as to largely suppress a Boudouard reaction with the graphite carbon.

The metal melt formed in the graphite column can, moreover, be carburized by carbon dust, or forms carbides dispersed in the metal bath, such as carbides of the metals iron, vanadium, chromium or tungsten. In principle, it is also feasible to reduce chromium from slags to below 60 ppm even when using relatively short graphite columns. The purity of a slag is of utmost importance, particularly for a "one third slag", which is used in an electroslag remelting Process for producing high-quality constructional and tool steels. Said slag essentially consists of one third (by weight) each of $CaF_2$ (fluorspar), CaO (quick lime) and $Al_2O_3$ (corundum) as well as, in some cases, of MgO, $SiO_2$ and the like. The method according to the invention is particularly suitable for the production of such slags, because H, P, S, $N_2$, C, Pb, Bi, CN, Na, K and B impurities can be eliminated in a particularly efficient manner. At present, said slag is produced by melting ultra-pure starting substances in an electric arc furnace. The very high temperatures in the electric arc (about 8000° C., plasma) and the electrode material (graphite) will, however, cause a very unfavorable carburization and carbide formation of Ca and Al as well as, partially, also a sulfurization by graphite-electrode residual sulfur. Similarly, the nitrogen of the air will be dissolved in this slag. Possible further impurities will remain in the produced slag.

By contrast, the method according to the invention offers a number of advantages:
- substantially lower temperatures, uniformly distributed and readily adjustable temperature levels, no temperature peaks (inductively heated graphite body bed);
- a reduction under partial volatilization of undesired elements by the addition of ultrapure "carbon blacks", hence a substantially more favorable raw material situation;
- the option of "regeneration" of used one-third slags by the reduction according to the invention; prevention of extremely expensive hazardous waste deposits; and recovery of valuable alloying components like Ni, Cr, V, W, Mo, Ta and the like;
- no bridge formation of the charging stock within the reactor, since it is sucked into the graphite bed (this constituting a big problem for the production in an electric furnace: "capping", inhomogenously melted material);
- a very cost-effective continuous melting process, small reactor volume (electric furnace only discontinuous);
- no refractory problems, since there is no slag contact with the refractory material in the induction zone;
- a high transformation efficiency of electrical energy into heat, very low heat losses as compared to an electrode furnace;
- the lowest exhaust gas amounts possible; suction gas is preferably an inert noble gas like Ar, yet also nitrogen or a reactive gas like, preferably, $F_2$, but also $H_2O$, $Cl_2$, $O_2$ or mixtures thereof.

In general, liquid slags of different origins may be used, and it is above all possible to reduce nickel oxide, iron oxide, phosphorus oxide, zinc oxide, lead oxide, manganese oxide, copper oxide, vanadium oxide and chromium oxide in a simple manner. Due to the good electrical conductivity of graphite, a high level of energy efficiency will be achieved, whereby a high stability will be maintained even at high temperatures, due to the substantially inert behavior of the graphite carbon.

Figure 2:
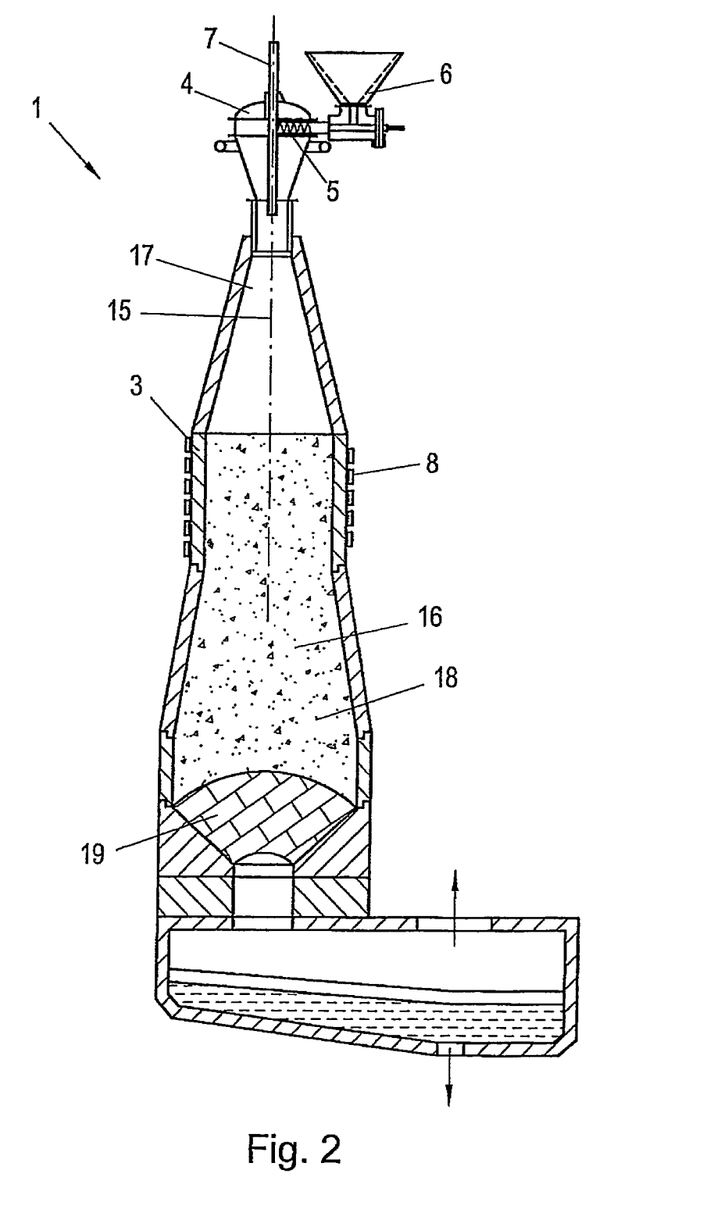
FIG. 2 shows another configuration of a reactor.

FIG. 2 again depicts a reactor 1 containing a graphite column 16. Unlike the reactor of FIG. 1, the present reactor in an axial region comprises a killing zone formed by an agglomeration zone 18, in which a reduction of the gas rate is achieved by the continuous cross-sectional enlargement of the reactor in the direction of the tap end. It is thereby possible to agglomerate the reduced melt particles, which are partially kept floating, by reducing the shearing forces acting on the same, and to remove them from the gas phase. In this reactor, a refractory bed is denoted by 19, which serves as a supporting arch for the graphite body or graphite bulk located thereabove. In the region of the refractory bed 19, the cross section is again reduced in the direction of the tap end, thus again mutually approaching the already agglomerated melt particles and further encouraging agglomeration.

Figure 3:
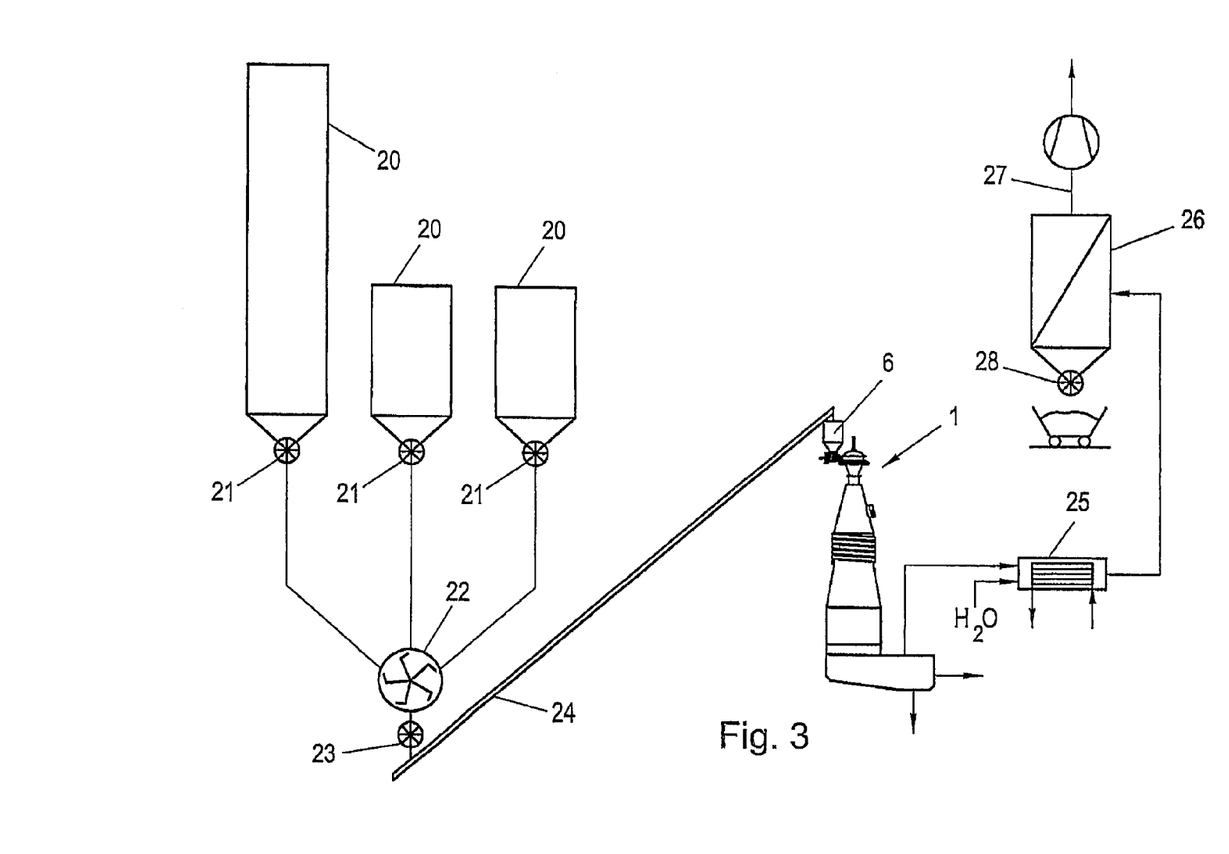
FIG. 3 depicts a process scheme illustrating the integration of a method according to the invention in an industrial application.

In the illustration according to FIG. 3, the reactor is again denoted by 1, wherein storage reservoirs or bins in which the reactants to be reduced are kept are denoted by 20. Via cellular wheel sluices 21, the different reactants can be controlledly supplied to a mixer 22, from which the reactant mixture can be fed to the charging hopper 6 of the reactor 1 via a further cellular wheel sluice 23 and a conveying means 24. Slags and metal melts are tapped on the tap end of the reactor, with the hot exhaust gases being fed to a heat exchanger 25 while supplying water. In the heat exchanger, a high-quality reducing or fuel gas is formed of carbon monoxide and hydrogen following the water gas reaction. By the addition of water or water vapor, possibly still present Zn vapor is converted into ZnO while forming hydrogen. The resulting exhaust gas is fed to a dust separator 26, in which possibly still present secondary dust is deposited, such that a pure burning gas can, for instance, be fed to a clinker kiln or a reduction furnace via an outlet duct 27. The secondary dust can be discharged from the dust separated via a cellular wheel sluice 28.

Figure 4:
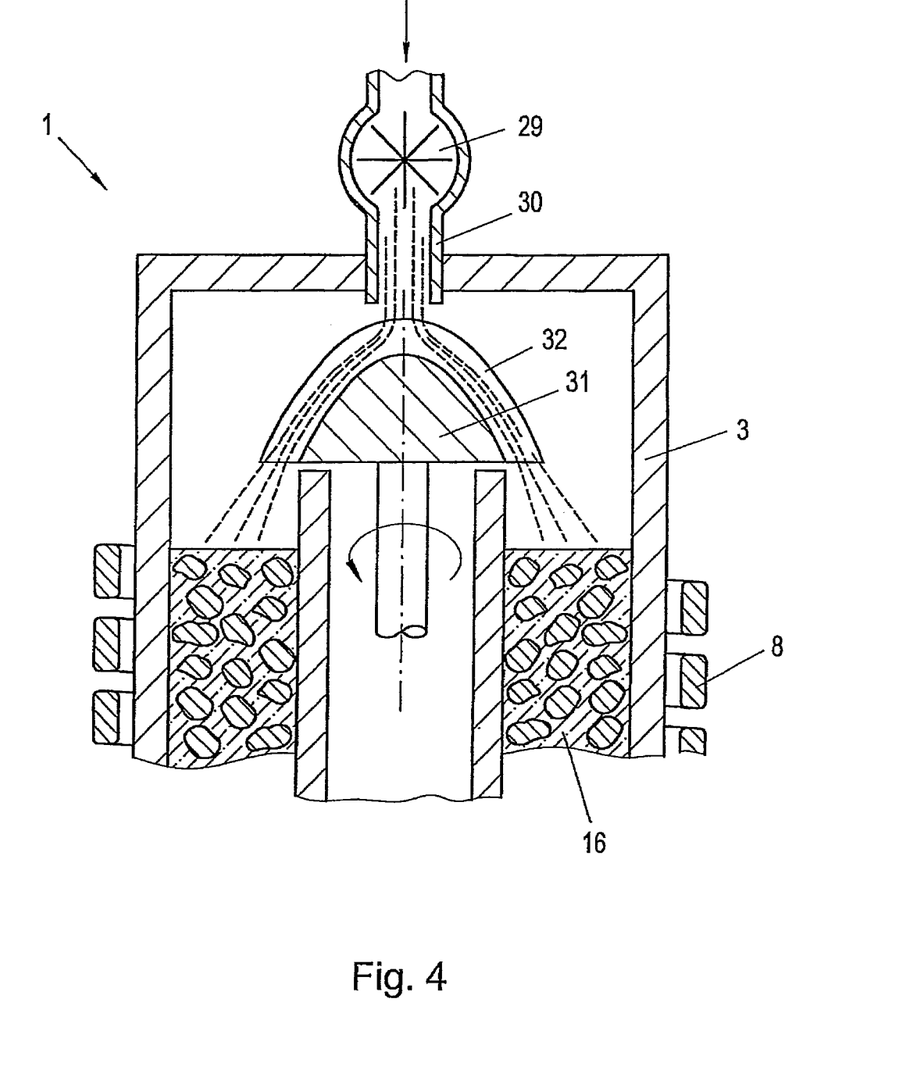
FIG. 4 depicts a preferred configuration of the charging device.

In FIG. 4, a cellular wheel sluice for charging reactant dust is denoted by 29, said reactant dust being feedable to the reactor 1 along with carbon carriers present in solid or gaseous form. The cellular wheel sluice 29 opens into a supply duct 30 passing through the housing 3 of the reactor 1. The supply duct 30 is directed to a rotationally mounted, mushroom-shaped distribution body 31, which is illustrated in section in FIG. 4. From this, it is apparent that grooves 32 are provided on the distribution body 31, which entrain the fed reactant dust and cause the reactant dust to slide downwards in the direction of the graphite bulk 16. Depending on the rotational speed of the distribution body 31, the reactant dust is flung differently far from the center of the reactor 1 to the periphery of the reactor 1 so as to enable the simple control of the application profile of the reactants on the graphite bulk.

Figure 5:
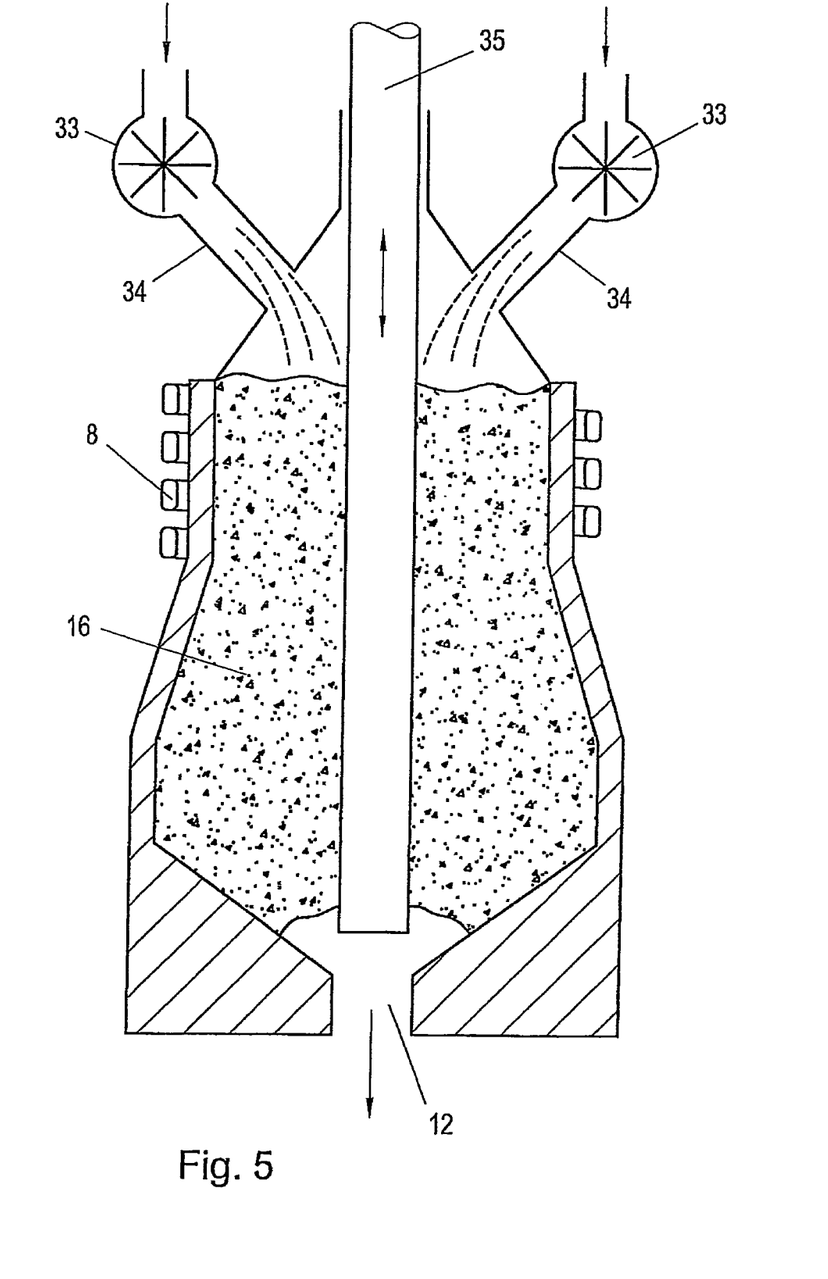
FIG. 5 depicts a preferred embodiment of the device for charging large amounts of reactant dust.

In FIG. 5, two cellular sluices are denoted by 33, which enable relatively large amounts of reactant dust to be charged onto the graphite bulk 16. Downspouts which are directed to the surface of the graphite bulk 16 at suitable angles are denoted by 34. A displacement body which can facultatively be heated to achieve the optimum temperature distribution within the graphite bulk 16 is denoted by 35. In the region of the opening 12, the displacement body 35 supports the graphite bulk, and tapping can be optimized by periodically oscillating the displacement body 35, whereby the graphite bulk 16 is, at the same time, loosened and obstructed regions of the graphite bulk 16 are cleared again where necessary.

The invention claimed is:

1. A method for processing and/or reducing solid or molten materials, comprising:
    charging solid or molten materials onto an at least partially inductively heated graphite body;
    introducing a reducing agent different from carbon of the graphite body; and
    collecting flowing-off reduced and/or degassed melt, wherein
    said reducing agent is introduced together with the solid or molten charging materials,
    said reducing agent is at least one selected from the group consisting of natural gas, carbon dust, brown-coal dust, hydrocarbons, hydrogen, carbon monoxide and ammonia, and
    said reducing agent is introduced along with at least one selected from the group consisting of water vapor, oxygen, carbon dioxide, halogens, and hydrogen halides, and
    further comprising the step of sucking into the graphite body the solid or molten charging materials and the reducing agent different from the carbon of the graphite body, wherein the step of sucking into the graphite body is accomplished by adjusting a pressure gradient over an axial length of the graphite body.

2. A method according to claim 1, wherein the graphite body is formed by a bed, a column, or a bulk of lumpy graphite.

3. A method according to claim 1, wherein the graphite body is configured as a graphite block comprising through-going channels or bores.

4. A method according to claim 1, wherein said reducing agent comprises the carbon dust or the brown-coal dust.

5. A method according to claim 1, wherein at least some of the reducing agent is in solid form, and is introduced by aid of a carrier gas, and the carrier gas is at least one selected from the group consisting of nitrogen, argon, CO, $CO_2$, $O_2$, and air.

6. A method according to claim 1, wherein, for axially consecutive sections of the graphite body, temperature and/or power input are separately measured, and the temperature and a redox regime are controlled in separate sections of the graphite body by adjusting at least one selected from the group consisting of electrical power, gases to be injected, and gas volumes to be injected.

7. A method according to claim 1, wherein glass particles or glass melts are charged onto the graphite body while the graphite body is in a red-hot state.

8. A method according to claim 1, wherein the graphite body comprises graphite in the form of at least one selected from the group consisting of spheres, cylinders, blocks, pelletized compacts, and electrode debris.

9. A method according to claim 1, wherein the graphite body is formed by graphite and a catalyst powder.

10. A method according to claim 1, wherein the graphite body is pressed with at least one selected from the group consisting of salts, metals, and ceramics, to adjust electrical conductivity of the graphite body.

11. A method according to claim 1, wherein the graphite body is configured in a controlled manner with respect to micro-porosities of the graphite body.

12. A method according to claim 1, wherein said inductive heating is effected by applying current at two different frequencies.

13. A method according to claim 12, wherein a first one of said two different frequencies is between 3 and 15 kHz, and a second one of said two different frequencies is below 0.5 kHz.

14. A method according to claim 1, wherein the graphite body is a bulk of a mixture of graphite and inert packing bodies, and the inert packing bodies are catalytically active CaO or MgO bodies.

15. A method according to claim 1, wherein steel mill dusts are charged together with the solid or molten charging materials to bind sulfur.

16. A method according to claim 1, wherein the solid or molten charging materials are at least one selected from the group consisting of shredded used tires, oily mill scale, polychlorinated biphenyls, contaminated used wood, contaminated excavated material comprising dioxins or furans, petroleum distillation residues, and dried sewage sludge.

17. A method for processing and/or reducing solid or molten materials, comprising:
    charging solid or molten materials onto an at least partially inductively heated graphite body;
    introducing a reducing agent different from carbon of the graphite body; and
    collecting flowing-off reduced and/or degassed melt, wherein
    said reducing agent is introduced together with the solid or molten charging materials,
    said reducing agent is at least one selected from the group consisting of natural gas, carbon dust, brown-coal dust, hydrocarbons, hydrogen, carbon monoxide and ammonia,
    said reducing agent is introduced along with at least one selected from the group consisting of water vapor, oxygen, carbon dioxide, halogens, and hydrogen halides, and
    redox potential of the graphite body is controlled by injecting gases, and temperature of the graphite body is controlled by changing electrical power input and by injecting gases.

18. A method for processing and/or reducing solid or molten materials, comprising:
- charging solid or molten materials onto an at least partially inductively heated graphite body;
- introducing a reducing agent different from carbon of the graphite body; and
- collecting flowing-off reduced and/or degassed melt, wherein
- said solid or molten charging materials are shredder light fractions,
- said reducing agent is introduced together with the solid or molten charging materials,
- said reducing agent is at least one selected from the group consisting of natural gas, carbon dust, brown-coal dust, hydrocarbons, hydrogen, carbon monoxide and ammonia, and
- said reducing agent is introduced along with at least one selected from the group consisting of water vapor, oxygen, carbon dioxide, halogens, and hydrogen halides.

* * * * *